(No Model.)
H. C. GIBSON.
TURKEY CALLER AND GOBBLER.
No. 574,534. Patented Jan. 5, 1897.
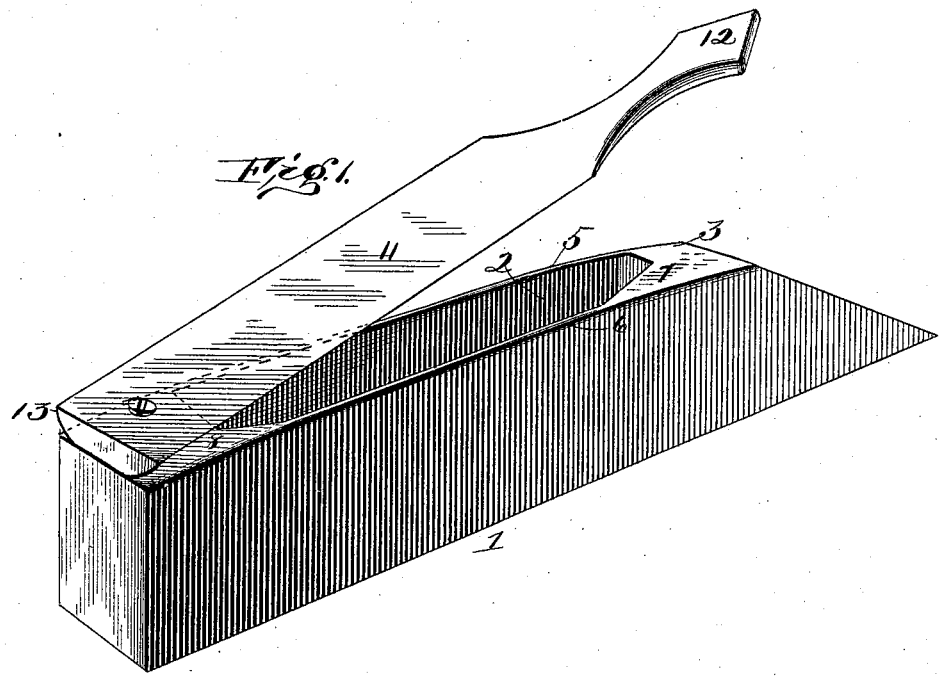
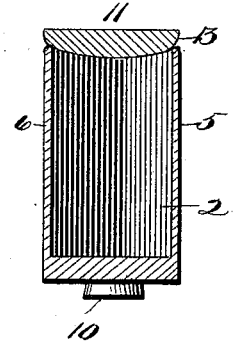
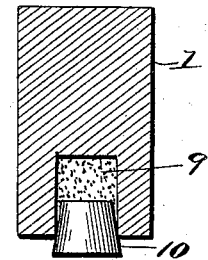

UNITED STATES PATENT OFFICE.

HENRY C. GIBSON, OF DARDANELLE, ARKANSAS, ASSIGNOR OF ONE-HALF TO JOHN R. BODDIE, OF ARKADELPHIA, ARKANSAS.

TURKEY CALLER AND GOBBLER.

SPECIFICATION forming part of Letters Patent No. 574,534, dated January 5, 1897.

Application filed June 17, 1896. Serial No. 595,846. (No model.)

*To all whom it may concern:*

Be it known that I, HENRY C. GIBSON, a citizen of the United States, residing at Dardanelle, in the county of Yell and State of Arkansas, have invented certain new and useful Improvements in Turkey Callers and Gobblers; and I do hereby declare the following to be a full, clear, and exact description of the invention, such as will enable others skilled in the art to which it appertains to make and use the same.

My invention is a turkey caller and gobbler; and it consists of a trough made of wood, preferably cedar, and a top hinged at one end and adapted to run over the bowl of the trough and thus create the sounds desired.

In the accompanying drawings, Figure 1 is a perspective view of my invention. Fig. 2 is a cross-sectional view near the middle of the invention. Fig. 3 is a cross-sectional view of the trough near the rear end, showing the rosin-receptacle and cork.

For the purpose of description the end at the right hand of the sheet of drawings will be called the "rear" end and the end at the left hand of the sheet will be called the "front" end.

My invention is described as follows:

1 represents a trough, in which 2 is the dugout or bowl. This dugout extends so near to the bottom that the bottom wall of the trough is just about the same thickness as the side walls; but the end walls 3 4 are much heavier than either of the other walls.

The right-hand wall 5 is considerably longer than the left-hand wall 6, this wall 6 being shortened by V extensions 7 and 8, extending from the walls 3 and 4, respectively. In the bottom of the rear end of the trough 1 is a recess 9 for the purpose of holding rosin and other like material. This recess is closed by a stopper 10. The rear end of the trough is beveled, commencing at the top and sloping backward. The top 11 is as long as the upper part of the trough and is provided with a handle 12. Its upper face is level, but its lower face 13 is oval. Said top is loosely pivoted to the front end of the trough with its oval face down.

To call, take the caller or trough by its rear end firmly in the left hand, then the handle of the top lightly between the thumb and forefinger of the right hand, then move it to the right moderately quick, letting it rub over the left side, stopping when the top is about straight with the box. Repeat until as many calls are made as you want. Three to five are better than more. A loud or low call is made by soft or hard pressure. The tone is changed by a pressure of the left thumb on the side of the caller. A good call may also be made on the right side by working the top either way. This tone would be one of a gobbler.

To gobble, move the top rather quickly two or three times across the whole top of the trough. It will be noticed that one side is longer than the other. This is to make the vibration heavier and give the sound desired. With both sides short the gobble would not be heavy or coarse. With both long it would not be fine enough for a good caller. The top of the box is slightly oval, so that the top or lid 11 bears on or near the center of the walls 5 6 to make the proper call.

Having described my invention, what I claim as new, and desire to secure by Letters Patent, is—

1. The combination of the block 1, having the bowl or dugout 2, end pieces 3 and 4, sides 5 and 6; top 11, having the oval under face 13, said top loosely pivoted on the top face of the wall 4, substantially as shown and described and for the purposes set forth.

2. The combination of the block 1, having the bowl or dugout 2, end pieces 3 and 4, having V extensions 7 and 8; long wall 5 and short wall 6; top 11, provided with handle 12, and oval under face 13, said top loosely pivoted on the top face of the wall 4, substantially as shown and described and for the purposes set forth.

3. The combination of the block 1, having the bowl or dugout 2, end pieces 3 and 4, having V extensions 7 and 8; long wall 5, and short wall 6, and recess 9; top 11, provided with handle 12, and oval under face 13, said top loosely pivoted on the top face of the wall 4, substantially as shown and described and for the purposes set forth.

In testimony whereof I affix my signature in presence of two witnesses.

HENRY C. GIBSON.

Witnesses:
W. L. LEE,
S. E. LOVE.